United States Patent
Balu et al.

(10) Patent No.: US 9,257,704 B2
(45) Date of Patent: Feb. 9, 2016

(54) CARBON NANOTUBE COMPOSITE STRUCTURES AND METHODS OF MANUFACTURING THE SAME

(75) Inventors: Venkatasubramani Balu, Santa Clara, CA (US); Charles D. Consorte, Fremont, CA (US); Michelle M. Rincon, San Francisco, CA (US); Tatsunori Suzuki, San Jose, CA (US)

(73) Assignee: Zeptor Corporation, Menlo Park, CA (US)

( * ) Notice: Subject to any disclaimer, the term of this patent is extended or adjusted under 35 U.S.C. 154(b) by 316 days.

(21) Appl. No.: 13/133,927

(22) PCT Filed: Jul. 2, 2010

(86) PCT No.: PCT/US2010/040931
§ 371 (c)(1),
(2), (4) Date: Aug. 25, 2011

(87) PCT Pub. No.: WO2011/005693
PCT Pub. Date: Jan. 13, 2011

(65) Prior Publication Data
US 2012/0121986 A1  May 17, 2012

Related U.S. Application Data

(60) Provisional application No. 61/223,338, filed on Jul. 6, 2009, provisional application No. 61/241,241, filed on Sep. 10, 2009, provisional application No. 61/259,365, filed on Nov. 9, 2009, provisional application No. 61/310,563, filed on Mar. 4, 2010, provisional application No. 61/347,995, filed on May 25, 2010.

(51) Int. Cl.
*H01M 4/64* (2006.01)
*H01M 4/62* (2006.01)
(Continued)

(52) U.S. Cl.
CPC .............. *H01M 4/625* (2013.01); *B82Y 30/00* (2013.01); *H01G 11/28* (2013.01); *H01G 11/36* (2013.01);
(Continued)

(58) Field of Classification Search
CPC .............................. H01M 4/663; H01M 4/667
USPC .................... 423/447.1; 429/141, 143, 231.1; 977/701, 722, 742, 778, 784
See application file for complete search history.

(56) References Cited

U.S. PATENT DOCUMENTS

| 5,879,836 A | 3/1999 | Ikeda et al. |
| 6,205,016 B1 | 3/2001 | Niu |

(Continued)

FOREIGN PATENT DOCUMENTS

| JP | 2009-21400 A | 1/2009 |
| JP | 2009-129745 A | 6/2009 |

(Continued)

OTHER PUBLICATIONS

Yoo et al. Fabrication of Multiwall Carbon Nanotube-nanocrystalline Copper Nanocomposite Film by Electrochemical Deposition. Mater. Res. Soc. Symp. Proc., vol. 1056, 2008, 1056-HH09-08 [online], [retrieved Jun. 24, 2014]. Retrieved from the Internet <URL: http://journals.cambridge.org/action/displayFulltext?type=1&fid=8012568&jid=OPL&volumeId=1056>.*

(Continued)

*Primary Examiner* — Basia Ridley
*Assistant Examiner* — James Erwin
(74) *Attorney, Agent, or Firm* — Morrison & Foerster LLP

(57) ABSTRACT

A current conductor for an electrochemical power device that includes an array of carbon nanotubes (CNT) anchored in a carbon nanotube metal composite layer and a structure that may incorporate nanoscale particles or thin film onto the current conductor is described. Additionally, a process for creating the structure using electrochemical plating of the metal layer onto the CNT array followed by separation of the structure from the substrate is provided. Another process includes creating the structure using co-electrodeposition of the CNT and metal from an electroplating bath using surfactants, physical energy, and a magnetic and/or electric field to orient the CNT and enhance the CNT density in the composite.

12 Claims, 11 Drawing Sheets

(51) Int. Cl.
| | |
|---|---|
| H01M 4/66 | (2006.01) |
| B82Y 30/00 | (2011.01) |
| H01G 11/36 | (2013.01) |
| H01G 11/86 | (2013.01) |
| H01M 4/90 | (2006.01) |
| H01G 11/28 | (2013.01) |

(52) U.S. Cl.
CPC .............. *H01G 11/86* (2013.01); *H01M 4/663* (2013.01); *H01M 4/9083* (2013.01); *Y02E 60/13* (2013.01); *Y02E 60/50* (2013.01)

(56) References Cited

U.S. PATENT DOCUMENTS

| | | | |
|---|---|---|---|
| 6,665,169 | B2 | 12/2003 | Tennent et al. |
| 6,709,471 | B2 | 3/2004 | Miyamoto |
| 7,273,095 | B2 | 9/2007 | Li et al. |
| 7,442,284 | B2 | 10/2008 | Ren et al. |
| 7,531,267 | B2 | 5/2009 | Kim |
| 7,585,584 | B2 | 9/2009 | Choi et al. |
| 7,651,766 | B2 | 1/2010 | Chen |
| 7,906,210 | B2 | 3/2011 | Sato et al. |
| 2003/0068551 | A1* | 4/2003 | Fukunaga et al. ............ 429/217 |
| 2006/0188774 | A1 | 8/2006 | Niu et al. |
| 2007/0031317 | A1* | 2/2007 | Akamatsu et al. ......... 423/447.1 |
| 2007/0202403 | A1* | 8/2007 | Oh et al. ...................... 429/217 |
| 2007/0238005 | A1 | 10/2007 | Yagi et al. |
| 2008/0170982 | A1 | 7/2008 | Zhang et al. |
| 2009/0215276 | A1 | 8/2009 | Vereecken et al. |
| 2010/0122910 | A1 | 5/2010 | Chen |

FOREIGN PATENT DOCUMENTS

| | | | |
|---|---|---|---|
| JP | 2009-129853 A | | 6/2009 |
| WO | WO 2008070926 A1 | * | 6/2008 |
| WO | 2008/140623 A1 | | 11/2008 |

OTHER PUBLICATIONS

Peng et al. The synthesis of a copper/multi-walled carbon nanotube hybrid nanowire in a microfluidic reactor. Nanotechnology, vol. 20, 2009, 235606 [online], [retrieved Jun. 9, 2014]. Retrieved from the Internet <URL: http://iopscience.iop.org/0957-4484/20/23/235606/>.*

Office Action received for Chinese Patent Application No. 201080030542.3, issued on Jan. 23, 2013, 17 pages (10 pages) of English Translation and 7 pages of Official copy).

International Search Report and Written Opinion for PCT Patent Application No. PCT/US2010/040931, mailed on Sep. 7, 2010, 6 pages.

International Preliminary Report on Patentability received for PCT Patent Application No. PCT/US2010/040931, issued on Jan. 10, 2012, 5 pages.

Arai et al., "Effects of Additives on Cu-MWCNT Composite Plating Films", Journal of the Electrochemical Society, vol. 157, No. 3, 2010, pp. D127-D134.

Arai et al., "Ni-Deposited Multi-Walled Carbon Nanotubes by Electrodeposition", Carbon, vol. 42, 2004, pp. 641-644.

Chen et al., "Tribological Application of Carbon Nanotubes in a Metal-Based Composite Coating and Composites", Carbon, vol. 41, 2003, pp. 215-222.

Flahaut et al., "Carbon Nanotube-Metal-Oxide Nanocomposites: Microstructure, Electrical Conductivity and Mechanical Properties", Acta Materialia, vol. 48, 2000, pp. 3803-3812.

Harris, P. J. F., "Carbon Nanotube Composites", International Materials Reviews, vol. 49, No. 1, 2004, pp. 31-43.

Hill et al., "Functionalization of Carbon Nanotubes with Polystyrene", Macromolecules, vol. 35, No. 25, 2002, pp. 9466-9471.

Hrapovic et al., "Electrochemical Biosensing Platforms Using Platinum Nanoparticles and Carbon Nanotubes", Analytical Chemistry, vol. 76, No. 4, Feb. 15, 2004, pp. 1083-1088.

Kuzumaki et al., "Processing of Carbon Nanotube Reinforced Aluminum Composite", Journal of Materials Research, vol. 13, No. 9, Sep. 1998, pp. 2445-2449.

Peigney et al., "Aligned Carbon Nanotubes in Ceramic-Matrix Nanocomposites Prepared by High-Temperature Extrusion", Chemical Physics Letters, vol. 352, Jan. 24, 2002, pp. 20-25.

Shaffer et al., "Fabrication and Characterization of Carbon Nanotube/Poly(vinyl alcohol) Composites", Advanced Materials, vol. 11, No. 11, 1999, pp. 937-941.

Wang et al., "Proton Exchange Membrane Fuel Cells with Carbon Nanotube Based Electrodes", Nano Letters, vol. 4, No. 2, 2004, pp. 345-348.

Office Action received for Chinese Patent Application No. 201080030542.3, issued on Aug. 29, 2013, 6 pages (3 pages of English Translation and 3 pages of Official copy).

Office Action received for Japanese Patent Application No. 2012-519622, mailed on Jan. 7, 2014, 12 pages (7 pages of English Translation and 5 pages of Official copy).

Office Action received for Chinese Patent Application No. 201080030542.3, issued on May 12, 2014, 7 pages (4 pages of English Translation & 3 pages of Official copy).

Office Action received for Chinese Patent Application No. 201080030542.3, issued on Dec. 1, 2014, 6 pages (3 pages of English Translation and 3 pages of Official Copy).

* cited by examiner

CARBON NANOTUBE COMPOSITE STRUCTURES AND METHODS OF MANUFACTURING THE SAME

CROSS-REFERENCE TO RELATED APPLICATIONS

This application is a National Phase filing under 35 U.S.C. §371 of International Application PCT/US2010/040931, filed on Jul. 2, 2010, and also claims benefit to earlier filed provisional applications bearing Ser. Nos. 61/223,338, filed Jul. 6, 2009, entitled ELECTRODE STRUCTURE FOR ELECTROCHEMICAL POWER DEVICE AND PROCESS SEQUENCE FOR PREPARING THE STRUCTURE; 61/241,241, filed Sep. 10, 2009, entitled ANODE STRUCTURE FOR AN ELECTROCHEMICAL POWER DEVICE AND PROCESS SEQUENCE FOR PREPARING THE STRUCTURE; 61/259,365, filed Nov. 9, 2009, entitled COMPOSITE ELECTRODE STRUCTURE FOR ANODE FOR BATTERIES AND PROCESS SEQUENCE FOR MAKING THE STRUCTURE; 61/310,563, filed Mar. 4, 2010, entitled METHOD TO MANUFACTURE SHEET OF METAL-CARBON NANOTUBE COMPOSITE; 61/347,995, filed May 25, 2010, entitled METHOD TO MANUFACTURE SHEET OF METAL-CARBON NANOTUBE COMPOSITE all of which are incorporated by reference herein in their entirety and for all purposes.

BACKGROUND

1. Field

This invention relates generally to structures and devices including an anchored array of carbon nanotubes (CNT) that extend from a conductive composite for application as a current conductor and fully or part of the electrode for an electrochemical power device such as a battery, supercapacitor, fuel cell, or the like. Additionally, the invention also generally relates to methods of manufacture of the structures and devices described above.

2. Related Art

Electrochemical power devices described herein generally include devices that can: store electrical energy in chemical form and release it back in electrical form on demand (for example, a Li ion battery that is used in mobile phones; convert chemical energy into electrical energy (for example, a fuel cell that can use a chemical fuel such as hydrogen or methanol and convert it into electrical energy); and/or store electrical energy and release it on demand (for example, a supercapacitor).

While the mechanism of energy storage and conversion maybe different in these devices, one common aspect of all these devices is the need for current conductors and/or electrodes. Each device typically has two electrodes, an anode, through which current flows into the device, and a cathode, through which current flows out of the device. Sometimes, a current collector, typically a metal such as copper or aluminum, is used in addition to or as part of an electrode for improved electrical conduction.

Carbon nanotubes (CNT) are generally known to have excellent electrical conductivity, thermal conductivity, mechanical strength, and chemical resistance. Although CNT have been observed over half a century ago, recent predictions of the remarkable physical properties of CNT sparked widespread interest in this material and CNT have been touted as the new material of the 21$^{st}$ century. CNT have been studied widely and various groups have proposed potential applications for this material in composites for higher strength and thermal conductivity, nano-probes and nano-pipettes for biomedical applications such as targeted drug delivery, field emission devices such as light emitting diodes, energy generation devices such as solar cells, nanoscale contact probes, nanoscale semiconductor device applications, electrodes for electrochemical energy devices such batteries, fuel cells, supercapacitors, and so on.

In the area for electrochemical energy devices, for example, CNT based structures have been suggested as potential candidates for electrodes for batteries, fuel cells, and supercapacitors. In particular, in the Lithium Ion battery field, there are several examples of utilizing CNT in electrodes. U.S. Pat. No. 6,709,471 discloses a CNT-Boron Nitride battery, which includes a structure utilizing the walls of the CNT as electrodes with Boron Nitride as an intermediate dielectric layer. Further, U.S. Pat. No. 5,879,836 describes using carbon fibrils as lithium intercalation sites in an electrode. Yet another example includes U.S. Pat. No. 7,442,284, which describes the use of an array of CNT coated with a conductive polymer as an electrode for various devices including energy storage devices.

In the field of fuel cells, U.S. Pat. No. 7,585,584 describes utilizing CNT grown on a carbon substrate with catalyst particles deposited on the CNT. Further, in the field of supercapacitors, U.S. Pat. Nos. 6,665,169 and 6,205,016, describe utilizing carbon nanofibers as electrodes to increase performance.

In addition to CNT, CNT based composites, which generally include conductive materials embedded with CNT, have been studied in an effort take advantage of the many desirable properties of CNT (see, e.g., "Carbon Nanotube Composites" Author: Harris P. J. F. International Materials Reviews, Volume 49, Number 1, February 2004, pp. 31-43(13)). Various CNT based composites and various techniques are known. For example, CNT-polymer composites are typically made by dissolving pre-treated CNT dispersed in a solution containing the polymer and controlled evaporation of the solvents (see, e.g., M. S. P. Shaffer and A. H. Windle: Adv. Mater., 1999, 11, 937-941; and D. E. Hill, Y. Lin, A. M. Rao, L. F. Allard and Y.-P. Sun: Macromolecules, 2002, 35, 9466-9471.), while CNT-ceramic composites are typically made by hot pressing ceramic powders with CNT (see, e.g., E. Flahaut, A. Peigney, C. Laurent, C. Marliere, F. Chastel and A. Rousset: Acta Mater., 2000, 48, 3803-3812; and A. Peigney, E. Flahaut, C. Laurent, F. Chastel and A. Rousset, Chem. Phys. Lett., 2002, 352, 20-25) and CNT-metal composites have been produced using hot drawing of CNT and metal powder (see, e.g., T. Kuzumaki, K. Miyazawa, H. Ichinose and K. Ito: J. Mater. Res., 1998, 13, 2445-2449), electroless plating (see, e.g., W. X. Chen, J. P. Tu, L. Y. Wang, H. Y. Gan, Z. D. Xu and X. B. Zhang: Carbon, 2003, 41, 215-222), co-electroplating a metal and CNT (see, e.g., "Effects of Additives on Cu-MWCNT Composite Plating Films," Susumu Arai, Takashi Saito, and Morinobu Endo, Journal of The Electrochemical Society, 157 (3) D127-D134 (2010); and "Fibrous Nanocarbon Metal Composite and Method for Manufacturing the same," U.S. patent application Ser. No. 11/257,742, filed Oct. 25, 2005) and electroplating a metal onto an array of CNT (see, e.g., "Nanoengineered thermal materials based on carbon nanotube array composites," U.S. Pat. No. 7,273,095). All of the references cited in the present disclosure are incorporated by reference herein as if fully set forth in their entirety.

BRIEF SUMMARY

According to one aspect of the present invention, structures for an electrochemical power device are provided. In one example, a structure includes a conductive composite layer and an array of carbon nanotubes anchored within, such that at least a portion of the carbon nanotubes extend from the composite conductive layer. The structure may further include nanoscale particles or a thin film disposed on the carbon nanotubes. The exemplary structures may be used as electrodes in various electrochemical power devices, such as batteries, fuel cells, or capacitors.

The portion the carbon nanotubes extending from the composite layer may be aligned in a common direction, more (or less) aligned than the portion anchored in the composite layer, or tangled. In some examples, the carbon nanotubes may extend from both sides of the composite layer. Further, the portion of the carbon nanotubes anchored in the composite layer may be tangled or aligned. In some examples, the conductive composite layer includes a carbon-metal composite material.

According to another aspect of the present invention, an exemplary process for forming a structure for an electrochemical power device is provided. In one example, the method includes forming or arranging an array of carbon nanotubes embedded or anchored in a conductive composite layer, where at least a first portion of the length of the array of carbon nanotubes extend from the conductive composite layer. In some examples, the first portion of the carbon nanotubes is further aligned along a common direction.

The array of carbon nanotubes may be formed at least partially aligned according to deposition processes, electroplating processes, a template, or the like. In one example, the structures are formed by passing a substrate through an electrochemical bath, the electrochemical bath having carbon nanotubes in solution, and electroplating a conductive layer having the carbon nanotubes to the substrate. A magnetic and/or electric field may be used to assist in aligning the carbon nanotubes during formation of the conductive composite layer. Further, the exemplary process for forming such structures may be part of a roll-to-roll manufacturing process.

DETAILED DESCRIPTION

The following description is presented to enable a person of ordinary skill in the art to make and use various aspects and embodiments of the present invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

According to one aspect of the present invention, and broadly speaking, structures including carbon nanotubes (CNT) anchored in a conductive composite, and extending therefrom, are described. The exemplary structures may be used as a conductor for an electrochemical power device such as a battery, capacitor, fuel cell, or the like. Further, exemplary processes for forming such structures and devices are provided. Initially, exemplary structures are described, followed by exemplary process and manufacturing methods.

Figure 1:
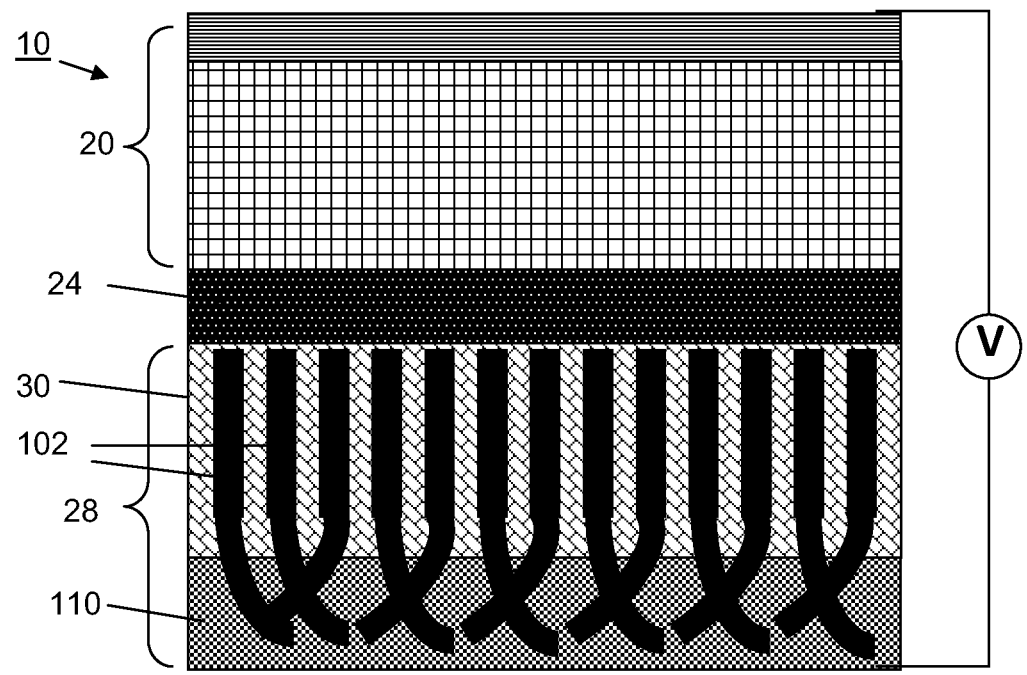
FIG. 1 illustrates an exemplary electrochemical power device, which may include one or more of the exemplary structures described herein.

Exemplary Devices and Structures:

FIG. 1 illustrates an exemplary electrochemical power device, which may include one or more of the exemplary current conductor structures described herein. In particular, FIG. 1 schematically illustrates a battery device 10, e.g., a Li-ion battery, generally comprising a cathode 20 and anode 28, separated by a separator 24. Cathode 20 is typically made of a metal oxide material and separator 24 is typically made of polymers such as polyethylene, polypropylene, laminates of such polymers, or the like. In this example, anode 28 comprises a CNT structure including CNT 102 anchored in a conductive composite layer 110, the CNT extending therefrom and within an electrolyte solution 30 such as a lithium salt or an organic solvent. Additionally, it will be recognized by those of skill in the art that the region of electrolyte solution 30 and/or anode 28 may include additional materials such as carbon or graphite powder, silicon powder or alloyed silicon powder, or the like, which forms the lithium ion intercalating part of the electrode.

Figure 2A:
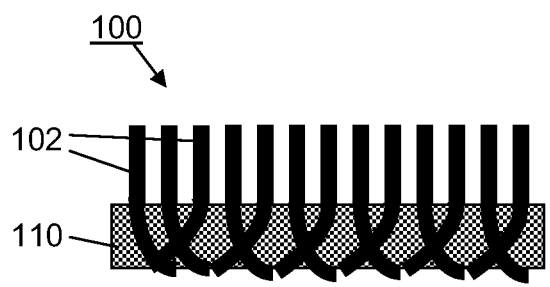
FIGS. 2A and 2B illustrate different embodiments of a current conductor structure for an electrochemical power device.

FIG. 2A illustrate a first embodiment of a current conductor structure 100 for an electrochemical power device. The exemplary structure 100 includes an aligned array of CNT 102 anchored in a conductive composite layer 110. In this particular example, CNT 102 are anchored within and extend from a first side of the conductive composite 110 and are generally aligned, that is, extending in a substantially parallel fashion from conductive composite 110. CNT 102 may further extend from a second side of conductive composite 110, e.g., on a side opposite of the first side. The extension of CNT 102 on the second side may or may not be aligned. CNT 102 may further form a mesh or be intertwined within conductive composite 110 as schematically illustrated, providing a mechanical anchor for CNT 102 therein.

The conductive composite may include various materials, such as conductive metals, metal alloys, conductive polymers, and the like. For example, a metal alloy including Ni, Zn, Cu, Al, Au, Ag, and/or other metals may be used.

CNT 102 may include single or multi-walled structures, may vary in height, width, and so on. Further, catalysts or particles may be deposited on CNT 102. In one example, CNT 102 may include a four wall structure to match the atomic spacing of a single crystal silicon lattice. CNT 102 may be aligned during deposition, e.g., via a physical vapor deposition or through the use of a template or the like (the template may include an anodized aluminum oxide (AAO) template, polymer-based template, ceramic based template, or the like). Exemplary processes for forming the structure of this and other embodiments will be described in greater detail below with references to FIGS. 6A-11.

Structure 100 may be used as a component or substructure of an electrochemical power device; particularly, for use as a current conductor in an electrochemical device. As one illustrative example, structure 100, and other exemplary structures described, may be used as an anode for a battery device, for example, as illustrated in FIG. 1.

Figure 2B:
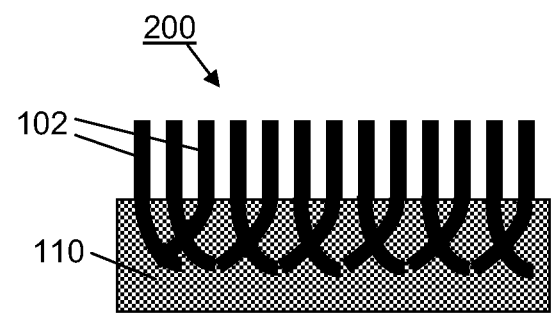

FIG. 2B illustrates a second embodiment of a current conductor structure 200 for an electrochemical power device. Structure 200 is similar to that of FIG. 2A, but in this example, conductive composite layer 110 fully covers one end of CNT 102 and extends beyond the conductive composite region. As such, CNT 102 only extends from one surface or side of the conductive composite 110.

Figure 3:
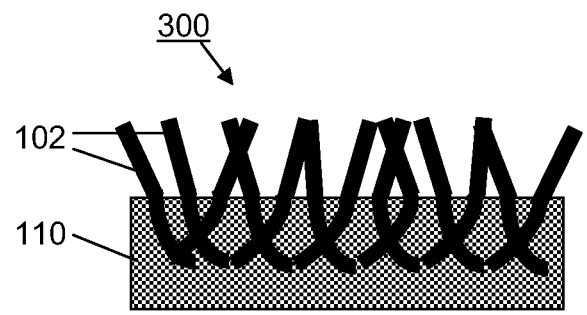
FIG. 3 illustrates another exemplary embodiment of a current conductor structure for an electrochemical power device.

FIG. 3 illustrates another exemplary embodiment of a current conductor structure 300 for an electrochemical power device. The current conductor and electrode structure of this example is similar to that of FIG. 2B, including an array of CNT 102 anchored in the conductive composite layer 110; however, in this example, CNT 102 are not necessarily aligned with respect to each other or aligned in a common direction. In one example, the portion of CNT 102 extending from composite layer 110 is more aligned along a direction perpendicular to the composite layer 110 than the portion embedded or anchored within composite layer 110. In one example, the portion of CNT 102 extending from composite layer 110 is less tangled than the portion embedded or anchored within composite layer 110.

Figure 4:
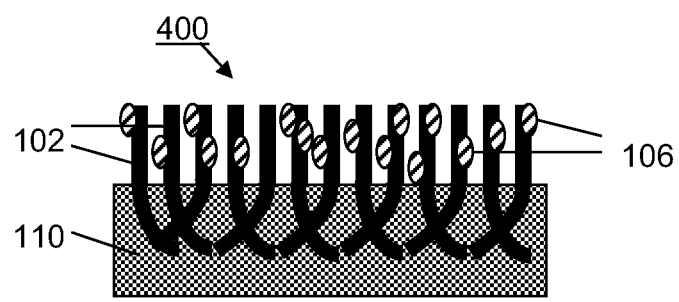
FIG. 4 illustrates another exemplary embodiment of a current conductor structure for an electrochemical power device.

FIG. 4 illustrates another exemplary embodiment of a current conductor structure 400 for an electrochemical power device. In this example, structure 400 is similar to that of FIGS. 2A and 2B, but further includes nanoparticles 106 disposed or attached to the aligned array of CNT 102 anchored in the conductive composite layer 110. Nanoparticles 106, for use in a battery device, may form part of the electrode and act as sites for lithium ion intercalation. For use in fuel cells, for example, nanoparticles 106 may serve as catalysts for driving chemical reaction Nanoparticles 106 may be deposited by any suitable process. In one example, nanoparticles are deposited by electrodeposition from a chemical bath having the particles dispersed in solution. Another exemplary process includes electroplating or electroless plating of nanoparticles to the structure. Yet another exemplary processing includes dispersing a nanoparticle powder with a solvent and an adhesive agent onto the structure and evaporating the solvent, thereby leaving the particles randomly adhered to the CNT 102 and conductive composite layer 110.

Figure 5:
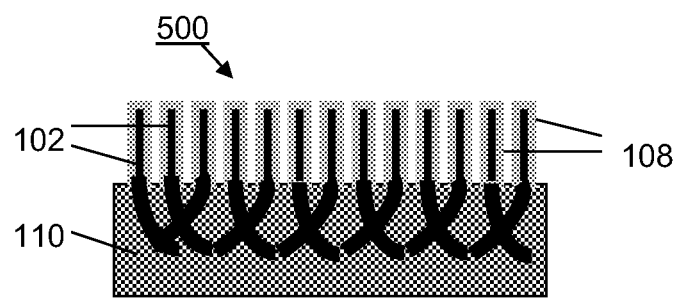
FIG. 5 illustrates another exemplary embodiment of a current conductor structure for an electrochemical power device.

FIG. 5 illustrates another exemplary embodiment of a current conductor structure 500 for an electrochemical power device. In this example, structure 500 is similar to that of FIG. 2A, 2B, or 4, but further includes a thin film or material 108 deposited on CNT 102 within the array; for example, at least on portions of the CNT 102 extending from composite layer 110. Material 108 may function as a lithium ion intercalation layer, for example.

Material 108 may include silicon. In one example, material 108 includes a graded silicon carbon layer that ranges from 100% C at the surface of each of the tubes of CNT 102 to 100% Silicon at the outer surface of the layer of material 108, where the gradation may assist in managing the stress associated in transitioning from one material to another. Material 108 may be deposited by any suitable process. In one example, material 108 is deposed by Plasma Enhanced Chemical Vapor Deposition (PECVD) and Atomic Layer Deposition (ALD) using precursor gases for C (such as $CH_4$), Si (such as $SiH_4$), and an inert gas (such as Ar or N2).

It will be recognized that other combinations of the examples shown herein are possible and contemplated. For example, nanoparticles and/or a thin film(s) may be included with any of the examples, extending CNT 102 on both sides of conductive composite layer 110 may be included with any of the examples, and any of the examples may extend from composite layer 110 as illustrated in FIG. 3.

Exemplary Processes:

Broadly speaking, and in embodiment for manufacturing exemplary structures described herein, an exemplary process includes forming an array of CNT anchored or embedded within a composite layer and extending therefrom. The CNT extending from the composite layer are at least partially aligned in a common direction. The portion of the array CNT anchored within the composite layer may be intertwined or positioned in non-aligned orientations.

FIGS. 6A-6E illustrate an exemplary process for forming a structure for an electrochemical power device. This exemplary process begins in FIG. 6A with a substrate 620 and a seed layer 622 formed thereon for subsequent CNT growth (and/or template deposition) as described below. Substrate 620 may include, e.g., silicon, germanium silicon dioxide, aluminum oxide, stainless steel, or the like. Seed layer 622 may include, e.g., cobalt, iron, nickel, or the like. Seed layer 622 may be deposited on substrate layer 622 in a variety of suitable processes, including various deposition processes (such as physical vapor deposition), electroplating, or the like. For example, a deposition of a Ni seed layer by physical vapor deposition to a thickness of less than 10 nm on an oxidized silicon substrate may be performed.

Figure 6A:
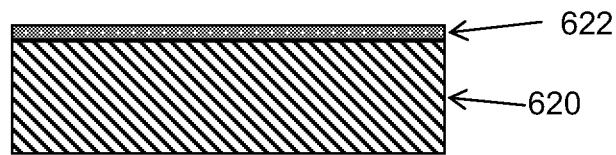
FIGS. 6A-6E illustrate an exemplary process for forming a structure for an electrochemical power device.
Figure 6B:
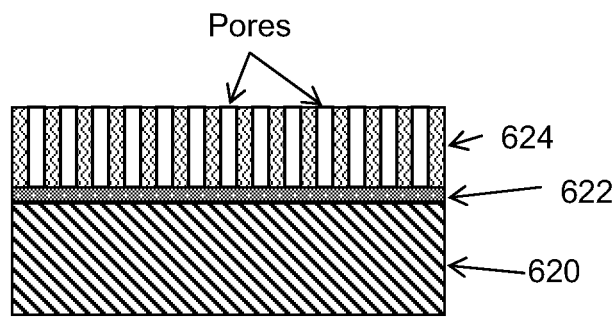

A template 624 is deposited on seed layer 622 as shown in FIG. 6B. In one example, template 624 is formed over seed layer 622 and a plurality of pores, having a high aspect ratio, are etched or otherwise formed therein for subsequent CNT growth. Template 624 may be formed of anodized aluminum oxide, anodized Al—Fe, anodized Ti, silicon dioxide, or the like. In one example, template 624 has a thickness of approximately 50 nm to 50 µm, and pores formed therein may have a diameter of 1 nm to 200 nm and a separation distance of 1 nm to 200 nm from each other. Of course, other dimensions are possible and contemplated.

The pores of template 624 may be formed through a variety of processes. In one example, an anodization technique may be used, where a block or film of material forming template 624 is anodized in a chemical bath and high voltage is used to etch out a pattern on the template. Additionally, patterning using photolithography, followed by dry etch of the pores may be used, for example.

Figure 6C:
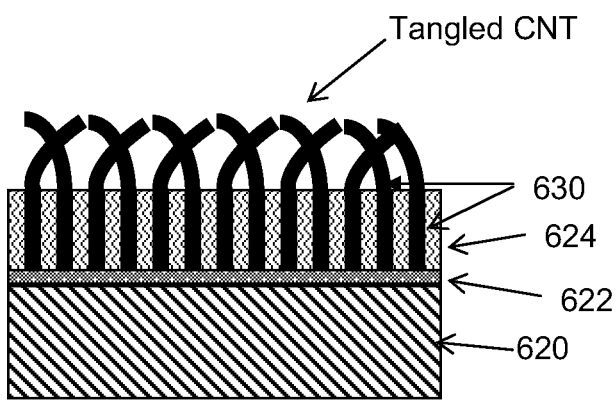

FIG. 6C illustrates CNT growth within the pores of template 624. In particular, CNT 630 are grown from seed layer 622, growing within the pores of template 624 and extending therefrom. CNT 630 are grown aligned within the pores of template 624, but once the CNT 630 growth exceeds the height of template 624, CNT 630 generally grow freely and become tangled as schematically shown. In one example, CNT 630 are grown by Plasma Enhanced Chemical Vapor Deposition (PECVD) using acetylene and ammonia at about 1 m Torr pressure and temperatures between 450° C. and 850° C. In another example, CNT 630 may be deposited using Atomic Layer Deposition (ALD) at temperatures ranging between from 20° C. to 450° C. CNT 630 may be grown single or multi-walled, and may vary in the number of walls along their height.

Figure 6D:
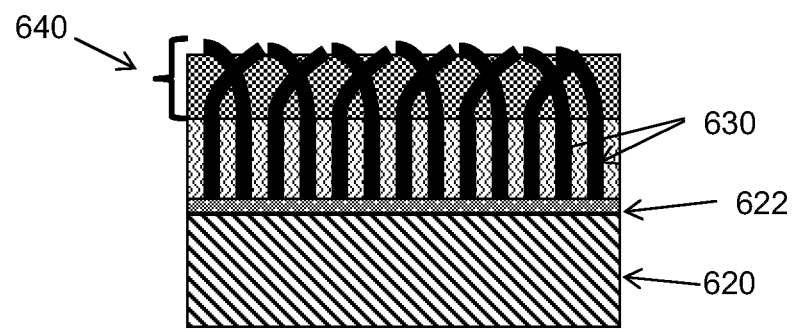

A composite layer 640 is deposited onto the tangled CNT as shown in FIG. 6D. In one example, a carbon-metal composite material is deposited over the tangled portions of CNT 630, above template 624. Composite layer 640 may include a metal alloy comprised of Ni, Zn, Cu, Al, Au, Ag, in any combination or ratio. Composite layer 640 may be deposited by Physical Vapor Deposition (PVD), electroplating, electroless plating, evaporation, or the like. Further, composite layer 640 may be deposited to a thickness of approximately 1 nm to 20 µm, which may or may not encapsulate or exceed the height of the tangled portion of CNT 630. Composite layer 640 may further be etched back after deposition for a desired thickness or surface characteristic. Further, a polymer may be used to coat composite layer 640.

Figure 6E:
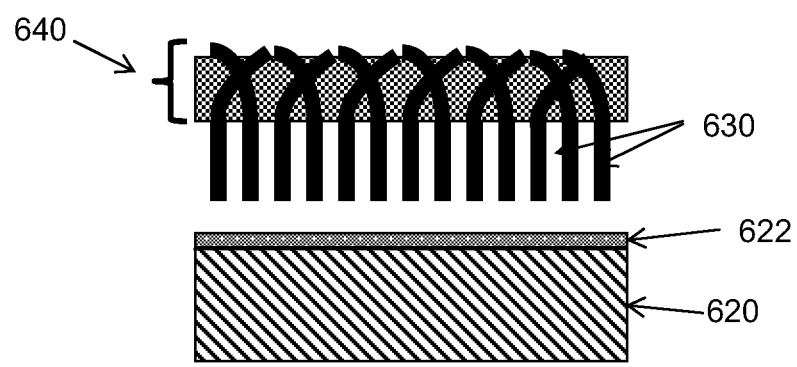

Composite layer 640 and CNT 630 are detached from substrate 620, seed layer 622, and template 624 as illustrated in FIG. 6E. For example, template 624 may be etched away, e.g., in a wet or dry chemical etch, resulting in detachment of the structure. In other example, substrate 620 may be mechanically peeled away from composite layer 640 and CNT 630. Further, in some examples, substrate 620 can be re-used in a subsequent process to form another structure.

FIGS. 7A-7D illustrate another exemplary process for forming a structure for an electrochemical power device. This example is similar to that of FIGS. 6A-6D; however, in this example, a template is not used. This exemplary process begins in FIG. 7A with a substrate 720 and a seed layer 722 formed thereon for subsequent CNT growth.

Figure 7A:
FIGS. 7A-7D illustrate another exemplary process for forming a structure for an electrochemical power device.
Figure 7B:
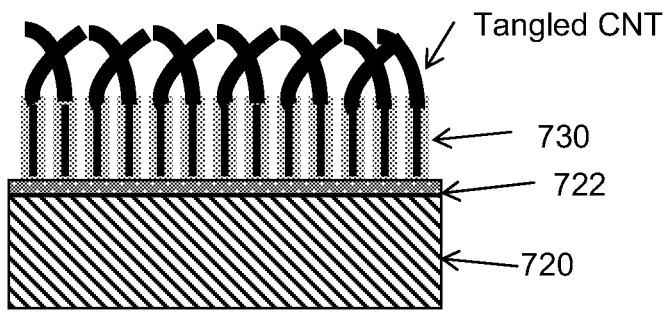

CNT 730 are grown having a first portion thereof aligned and a second portion thereof un-aligned or tangled, as shown in FIG. 7B. For example, CNT 730 may be grown using Chemical Vapor Deposition (CVD) or Plasma Enhanced Chemical Vapor Deposition (PECVD), without the use of a template, where once the growth of CNT 730 reaches a certain height, e.g., 50 µm to 500 µm, they generally grow freely and become tangled. The tubes of CNT 730 generally have a tendency to tangle due to surface forces, where the likelihood of tangling increases as the aspect ratio (height/diameter) exceeds about 100-1000. In PECVD processes, the presence of a plasma, and hence an electric field, typically keeps the tubes aligned, but shutting off the plasma while keeping the gases flowing can lead to continuation of the growth in a unaligned manner. In one example, the CNT 730 are disposed by PECVD using acetylene and ammonia at about 1 m Torr pressure and temperature ranging from 450° C. to 850° C.

Figure 7C:
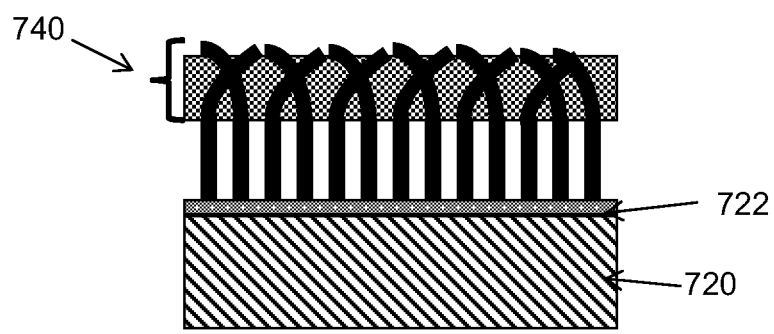

As illustrated in FIG. 7C, a composite layer 740 is then deposited over the tangled portion of CNT 730. Composite layer 740 may be deposited by Physical Vapor Deposition (PVD), electroplating, electroless plating, evaporation, or the like. Further, composite layer 740 may include a thickness of 1 nm to 20 µm, which may or may not encapsulate or exceed the height of the tangled portion of CNT 730.

In one example, a top down deposition is used to form composite layer 740, such that the tangled structure of CNT 730 receives the deposition of composite layer 740 and effectively seals off most of the aligned portion of CNT 730 from deposition. Of course, in some examples, some of the aligned portion of CNT 730 may be covered by the material as well. The deposition conditions of composite layer 740 can be controlled in an attempt to not fill beyond a certain depth, e.g., using lower deposition rates and adding bias in the PVD process, and/or removing or reducing additives such as polyalkylene glycol and organic sulfides in electroplating, which may reduce the tendency to fill deep into the structure.

Figure 7D:
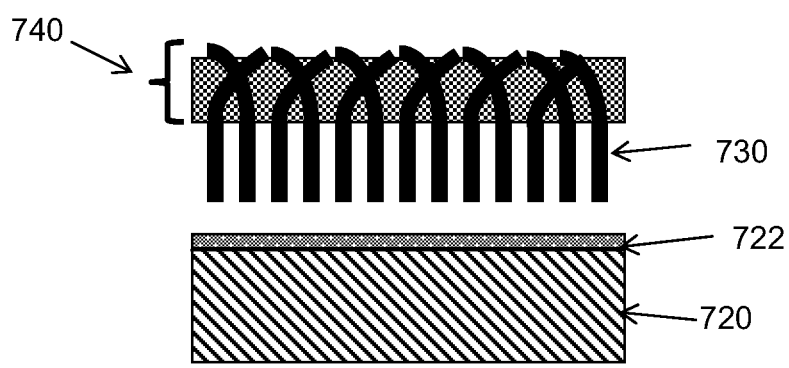

The structure of the CNT 730 and composite layer 740 is detached from the substrate 720 and seed layer 722 as illustrated in FIG. 7D. For example, composite layer 740 and CNT 730 may be peeled or mechanically removed from substrate 720 and seed layer 722. In some examples, substrate 720 can be re-used in a subsequent process to form another structure.

FIGS. 8A-8F illustrate another exemplary process for forming a structure for an electrochemical power device. This example is similar to that of FIGS. 7A-7D; however, in this example, CNT 830 are detached from the substrate 820 and seed layer 822 before the addition of a composite material layer. This exemplary process begins in FIG. 8A with a substrate 820 and a seed layer 822 formed thereon for subsequent CNT growth.

Figure 8A:
FIGS. 8A-8F illustrate another exemplary process for forming a structure for an electrochemical power device.
Figure 8B:
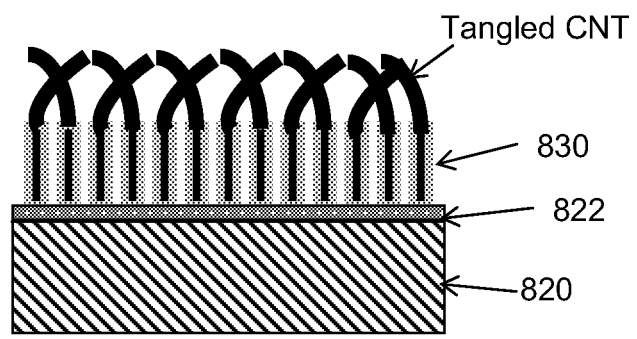

CNT 830 are grown having a first portion thereof aligned and a second portion thereof tangled, as shown in FIG. 8B. For example, CNT 830 may be grown using Chemical Vapor Deposition (CVD), for example, without the use of a template. Once the growth of CNT 830 reaches a certain height, e.g., 50 µm to 500 µm depending on the particular process, they generally grow freely and become tangled as shown.

Figure 8C:
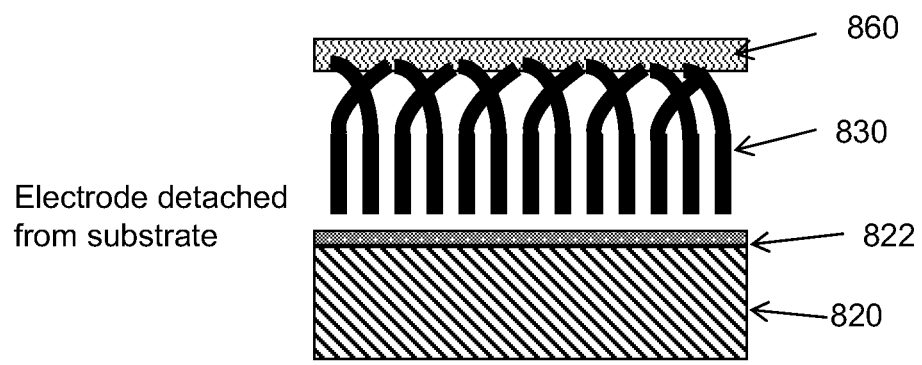
Figure 8D:
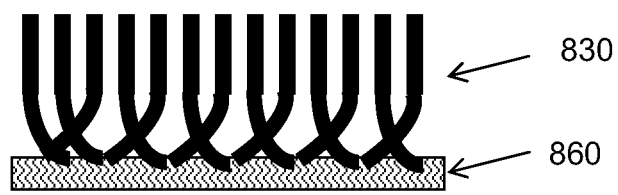

As illustrated in FIGS. 8C-8D, CNT 830 are then detached from substrate 820 and seed layer 822. In one example, a conductive adhesive tape 860 is pressed on the tangled portion of CNT 830 and then moved to detach or peal CNT 830 from substrate 820. Of course, other processes may be used for detaching CNT 830.

Figure 8E:
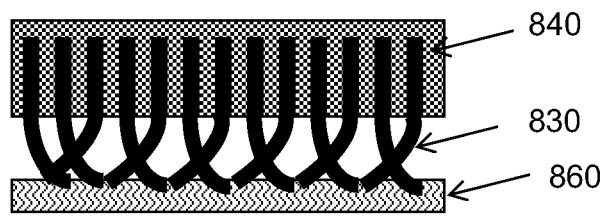

As illustrated in FIG. 8E, a composite 840 is then deposited onto the tangled portion of CNT 830. Composite layer 840 may be deposited by Physical Vapor Deposition (PVD), electroplating, electroless plating, evaporation, or the like. Further, composite layer 840 may include a thickness of 1 nm to 100 nm, which may or may not encapsulate or exceed the height of the tangled portion of CNT 830.

Figure 8F:
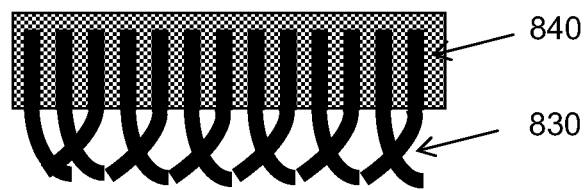

The structure is further detached from tape 860 as illustrated in FIG. 8F. For example, composite 840 and CNT 830 may be peeled or mechanically removed from tape 860. In other examples, tape 860 may be omitted, and a metal may be deposited on the tangled portion of CNT 830 by evaporation or spin on a liquid polymer glue layer that solidifies subsequently, and used in a manner similar that shown for tape 860.

According to another exemplary embodiment of the present invention, a co-electrodeposition process for forming exemplary structures is provided. In particular, a co-electrodeposition process of CNT and conductive composite layers is described, where the CNT are at least partially extend from the conductive composite layer.

Figure 9:
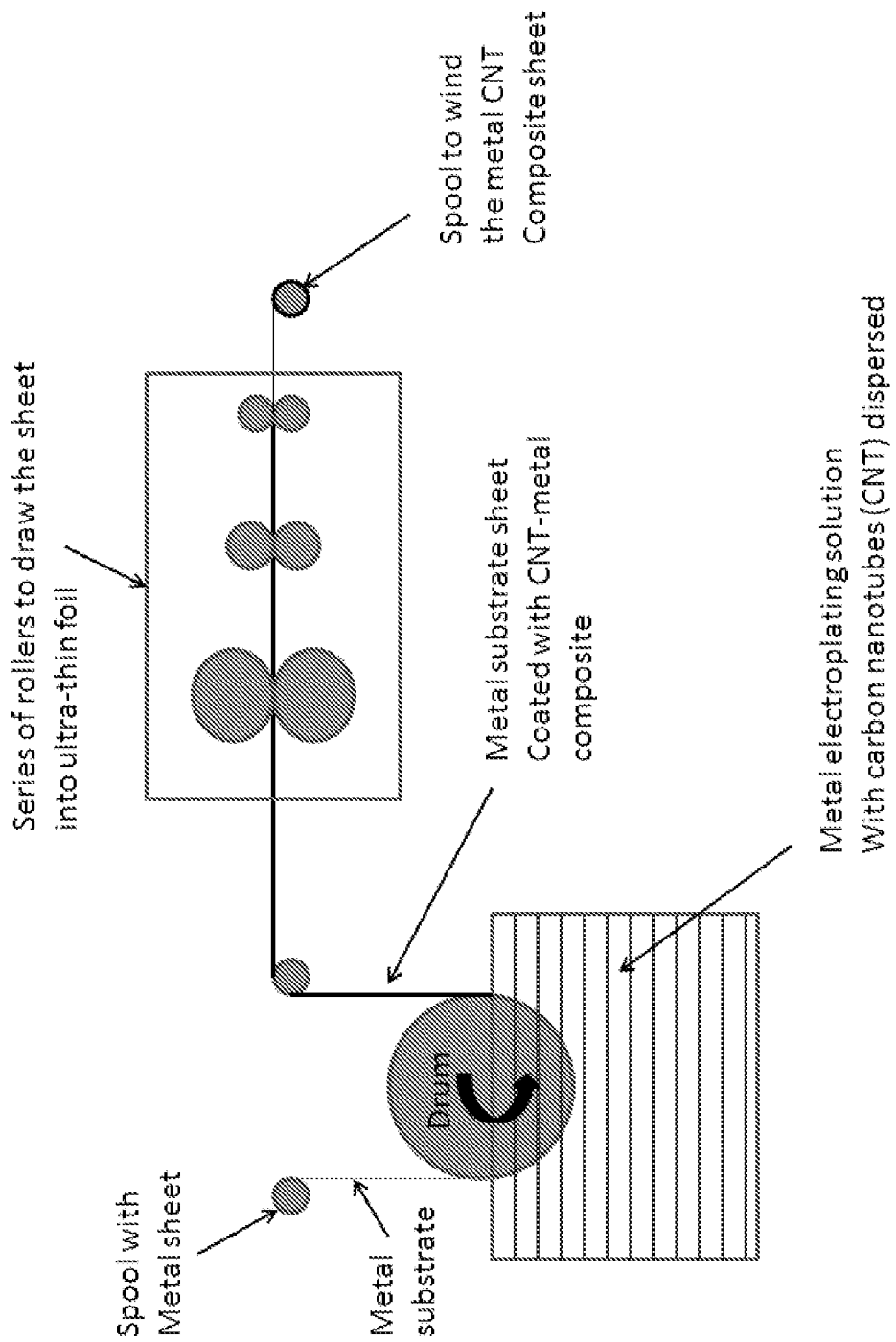
FIG. 9 illustrates an exemplary roll-to-roll process for forming structures for an electrochemical power device according to one embodiment.

FIG. 9 schematically illustrates a first exemplary roll-to-roll process and system for forming exemplary structures as described herein. In particular, the exemplary process begins with a spool of substrate material. The substrate material may include a metal or alloys of copper, nickel, aluminum, zinc, gold, silver, stainless steel, or the like, ranging in thickness from 5 µm to 5 mm.

The substrate material passes through an electroplating solution with CNT dispersed therein, for example, by passing around a drum at least partially submerged in the electroplating solution. The electroplating solution generally contains a solution of the metal or metal ion being deposited as the composite layer and CNT dispersed therein (after appropriate surface treatment for decontamination, for example). The electroplating solution may include a copper-plating electrolyte based on copper sulfate acidified with sulfuric acid. In one example, a bath may include a copper sulfate concentration of between 0.1 and 1.0 moles and a sulfuric acid concentration of between 0.2 and 4 moles. Further, the CNT content of the bath may be between 1 and 50 percent by weight in one example. In another example, the CNT content may be between 1 and 50 percent by volume.

Exemplary Electroplating Chemical Bath:
CuSO4 (0.1 to 1M)
H2SO4 (0.2-2M)
Multiwall CNT or Carbon Nanofiber (0.5-5 g/Liter)
Surfactant (example Triton™) 0.1% to 5% by volume of solution
Agitation by a magnetic stirrer at 60 rpm, solution at 25 C
Electroplating current 0.1 to 8 A/dm2 (Amps per decimeter squared)

Of course, various other concentrations, compositions, and/or electroplating solutions are possible and contemplated depending on the desired composite layer and characteristics, CNT characteristics, material thicknesses, and so on. Additionally, the electroplating bath may include various other additives such as chloride ions, polyether, organic sulfide, nitrogen compounds, and so on. Other examples of electroplating with CNT in solution, including various electroplating solution characteristics, are described in U.S. Pat. No. 7,651,766 and U.S. Patent Publication No. 2010/0122910, both of which are incorporated herein by reference in their entirety.

In this example, the drum provides the negative electrode and a positive electrode made of the metal being deposited (not shown in figure) is used along with an electrical field to drive the deposition process. For example, an electric field may be used to attract the CNT to the metal substrate such that they are at least partially encased by the metal composite during the electroplating process and extend from the deposited metal composite layer. The chemical solution may also be subjected to physical energy such as agitation, bubbling of gas, ultrasonic or megasonic waves to improve mixing, the addition of non-ionic surfactants to prevent adhering of the CNT, and so on.

After deposition, this example illustrates an optional intermediate set of rollers to reduce the thickness of the sheet. Further, in one example, the substrate layer may be peeled off from the composite layer prior to passing through the set of rollers or otherwise being wound on the final spool. The formed structures, e.g., including a composite layer, including anchored CNT extending at least partially therefrom, may be used to form various electrochemical power devices as described. Further, the formed structures may be cut in various sizes, e.g., dimensions ranging from 1 mm by 1 mm to 1 m by 1 m or larger.

In other examples, the composite layer, including anchored CNT, may be formed in an electroplating process without the use of a substrate. For example, the composite layer may be formed on the drum (or other element of the electroplating apparatus in the solution) and then peeled or removed therefrom.

Figure 10:
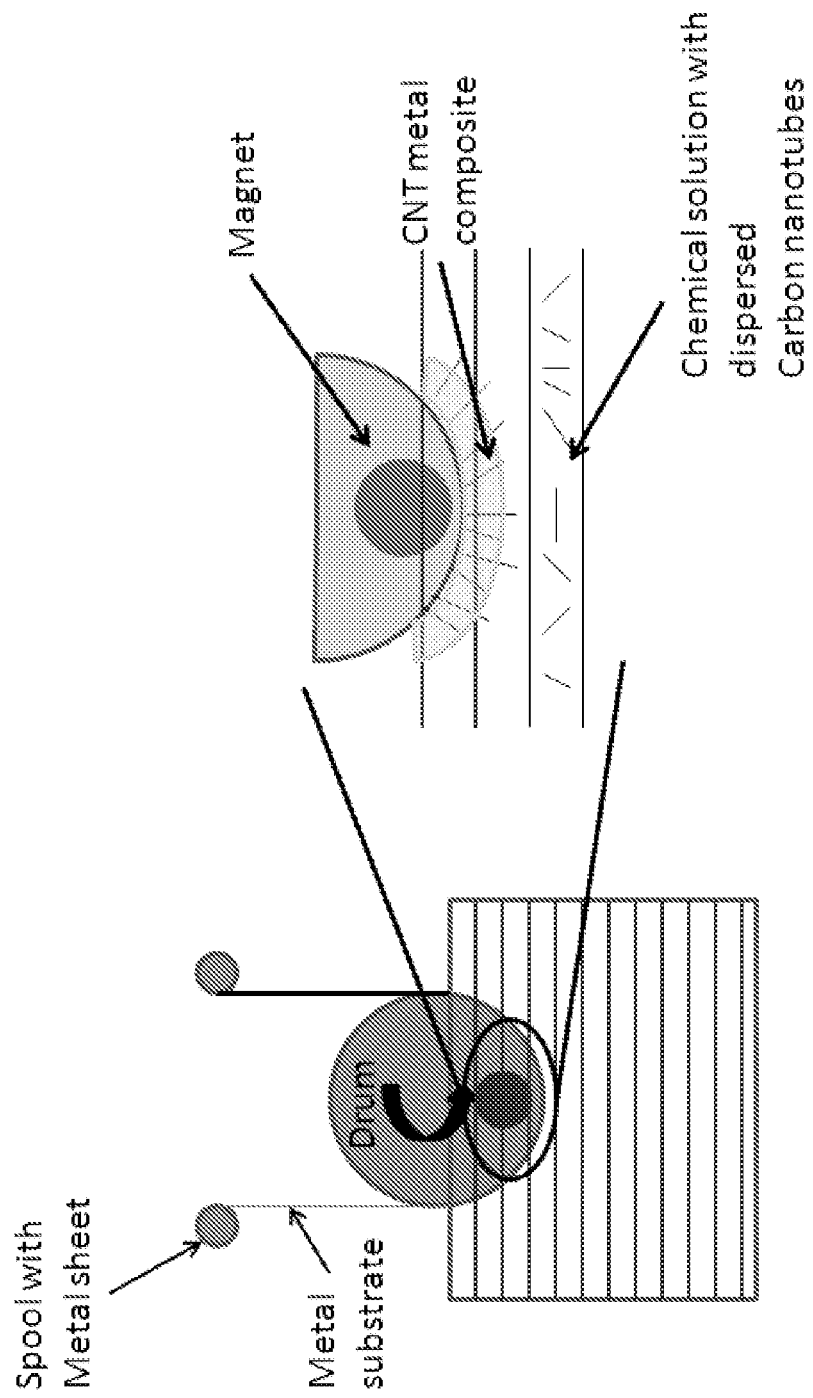
FIG. 10 illustrates an exemplary roll-to-roll process for forming structures for an electrochemical power device according to another embodiment.

FIG. 10 illustrates another exemplary co-electrodeposition process of CNT and metal composite layers. This example is similar to the process described for FIG. 9, however, in this example, a magnet field is used to orient the carbon nanotubes in the solution and potentially increase the density of CNT within the composite formed on the substrate. For instance, a magnet may be placed within the drum to attract and orient the CNT in solution such that they are captured within in and extend out of the metal being deposited on the substrate as illustrated in the CNT metal composite portion. This example may provide for greater alignment of the CNT extending from the metal composite layer than without such a magnetic field.

Figure 11:
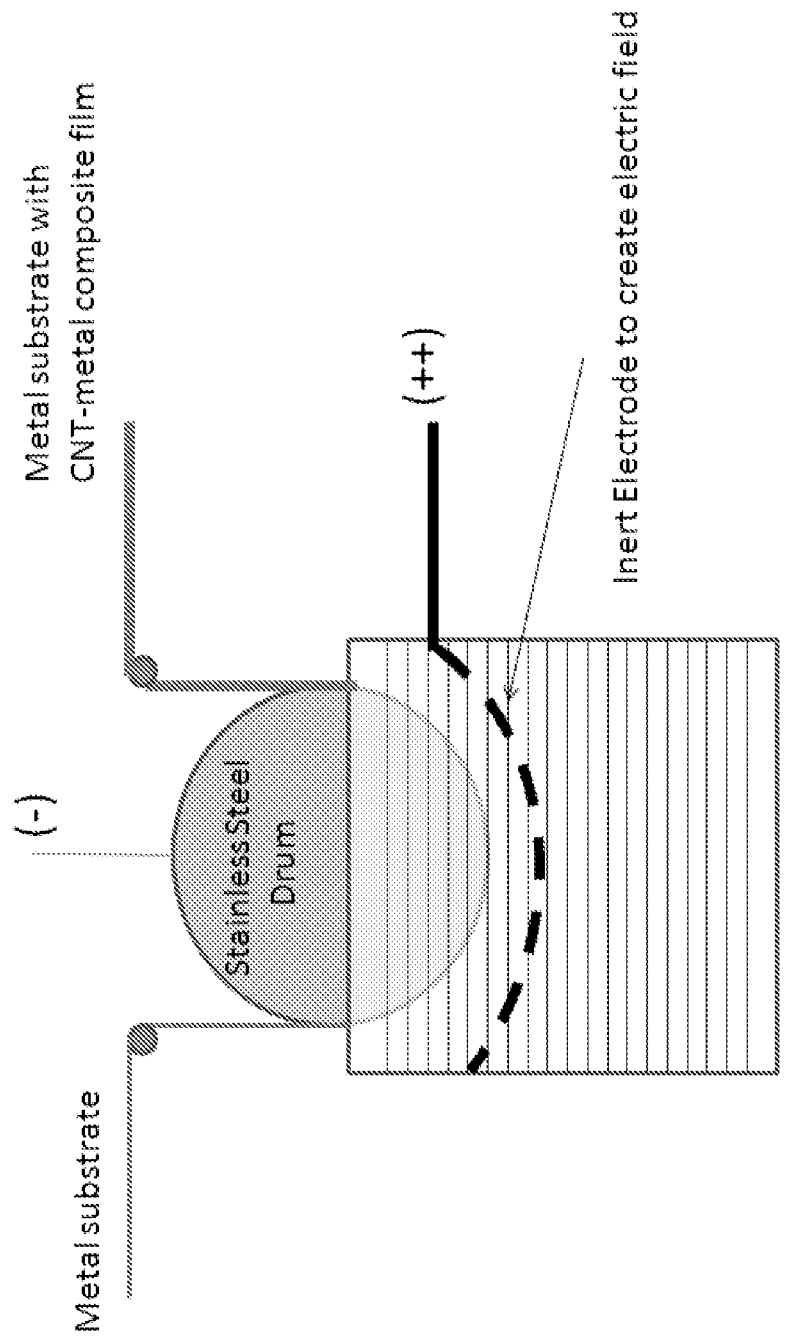
FIG. 11 illustrates an exemplary roll-to-roll process for forming structures for an electrochemical power device according to another embodiment.

FIG. 11 illustrates another exemplary co-electrodeposition process of CNT and metal composite layers. This example is similar to the process described for FIG. 10, however, in this example, an inert electrode is used within the bath to create an electric field for orienting the CNT in the solution and potentially increasing the density of CNT within the composite formed on the substrate, similar to that described with reference to FIG. 10. Further, this example may provide for greater alignment of the CNT extending from the metal composite layer than without such an electric field.

Figure 12:
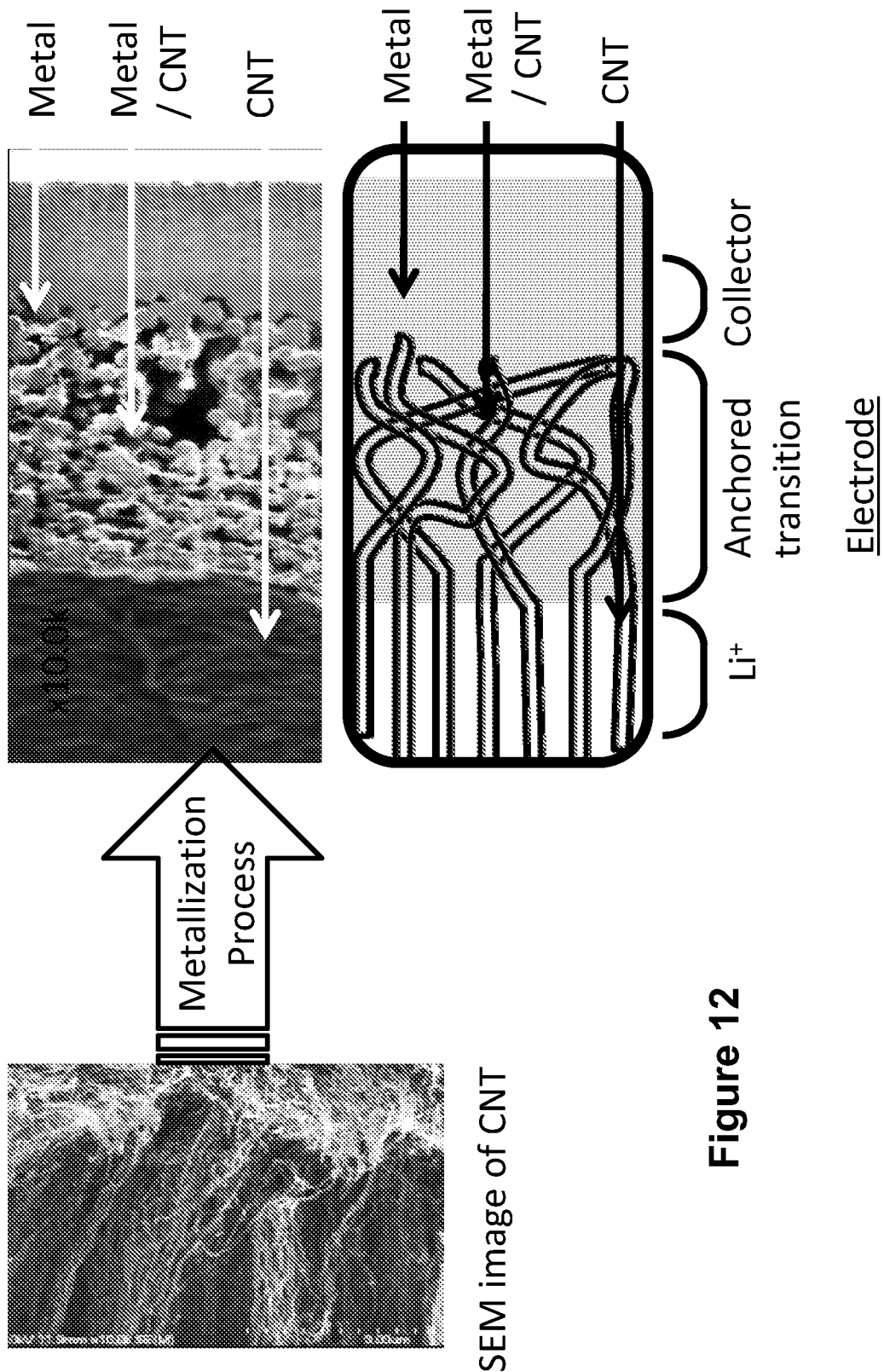
FIG. 12 illustrates an exemplary Scanning Electron Microscope (SEM) image of a structure in accordance with certain embodiments described herein.

FIG. 12 illustrates an exemplary SEM image of a structure in accordance with certain embodiments described herein. In particular, FIG. 12 illustrates a SEM image of CNT before and after a metallization process, i.e., the addition of a metal composite layer to anchor the CNT. Particular, to anchor the tangled portion of the CNT. Further, the figure includes a schematic depiction of the various components of the structure after metallization, e.g., an array of aligned CNT, which may be disposed in Li-ions as part of a Li-ion battery, the array of CNT anchored in a metal layer. The structure illustrates in the SEM images was formed according to the process illustrated in FIGS. 7A-7D.

The above-described embodiments of the present invention are merely meant to be illustrative and not limiting. Various changes and modifications may be made without departing from the invention in its broader aspects. The appended claims encompass such changes and modifications within the spirit and scope of the invention.

We claim:

1. A lithium ion battery, comprising:
a current collector structure having:
an array of carbon nanotubes; and
a conductive carbon nanotube metal composite layer, wherein each of the carbon nanotubes is anchored below a surface of the composite layer and extends primarily perpendicularly away from the surface of the composite layer and into an electrolyte solution.

2. The lithium ion battery of claim 1, wherein the array of carbon nanotubes provide connection points for the current collector structure.

3. The lithium ion battery of claim 1, wherein the anchored array of carbon nanotubes reduce delamination of the current collector structure.

4. The lithium ion battery of claim 1, wherein the current collector structure forms an anode and comprises copper and silicon or tin based materials, and further comprising a cathode structure comprising aluminum and lithium metal oxide.

5. The lithium ion battery of claim 1, wherein the array of carbon nanotubes extend from within the conductive carbon nanotube metal composite layer seamlessly.

6. The structure of claim 1, wherein the conductive composite layer comprises a carbon-metal composite material.

7. The structure of claim 1, wherein the carbon nanotubes extend from a first side and a second side of the composite layer.

8. The structure of claim 1, wherein the portion of the array of carbon nanotubes extending from the composite layer is aligned in a common direction.

9. The structure of claim 1, wherein the portion of the array of carbon nanotubes extending from the composite layer is more aligned in a common direction than a portion of the array of carbon nanotubes anchored in the composite layer.

10. The structure of claim 1, wherein a portion of the array of carbon nanotubes anchored in the composite layer is not aligned.

11. The structure of claim 1, wherein a portion of the array of carbon nanotubes anchored in the composite layer is tangled within the composite layer.

12. The structure of claim 1, wherein the carbon nanotubes comprise multi-walled tubes.

* * * * *